United States Patent
Ahn (10) Patent No.: US 8,091,622 B2
(45) Date of Patent: Jan. 10, 2012

(54) SYSTEM AND METHOD FOR COOLING ENGINE ROOM USING BLOWING DEVICE

(75) Inventor: Byung Jin Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1355 days.

(21) Appl. No.: 11/635,354

(22) Filed: Dec. 6, 2006

(65) Prior Publication Data
US 2008/0060591 A1 Mar. 13, 2008

(30) Foreign Application Priority Data
Sep. 11, 2006 (KR) .................. 10-2006-0087587

(51) Int. Cl.
*B60H 1/00* (2006.01)

(52) U.S. Cl. ............... 165/202; 165/42; 165/43; 165/51

(58) Field of Classification Search .......... 165/202, 165/203, 204, 41, 42, 43, 44, 51
See application file for complete search history.

(56) References Cited

U.S. PATENT DOCUMENTS
5,735,338 A * 4/1998 Chevroulet et al. .......... 165/42

FOREIGN PATENT DOCUMENTS
JP 08-025982 1/1996
JP 08-164756 6/1996
* cited by examiner

*Primary Examiner* — Ljiljana Ciric
(74) *Attorney, Agent, or Firm* — Edwards Wildman Palmer LLP; Peter F. Corless (57) ABSTRACT

The present relates to a system for cooling a vehicle engine compartment having a blowing device provided on a dash panel of a vehicle and configured to be able to send external air to the engine compartment and a cabin of the vehicle; a control unit to control the blowing device such that the external air may flow into the engine compartment through the blowing device if the temperature of the engine compartment is higher than or equal to a limit temperature above which components in the engine compartment can be heat damaged; a door consisting of an engine compartment door rotatably installed between the opening and the cabin air supplier and a cabin door rotatably installed on the same line as the engine compartment door; and an actuator for opening and/or closing the engine compartment door and the cabin door, respectively.

11 Claims, 12 Drawing Sheets

SYSTEM AND METHOD FOR COOLING ENGINE ROOM USING BLOWING DEVICE

CROSS-REFERENCE TO RELATED APPLICATION

This application claims priority to and the benefit of Korean Patent Application No. 10-2006-0087587 filed in the Korean Intellectual Property Office on Sep. 11, 2006, the entire contents of which are incorporated herein by reference.

BACKGROUND OF THE INVENTION (a) Field of the Invention

The present invention relates to a system for cooling an engine compartment using a blowing device, and more particularly, to a system for cooling an engine compartment using a blowing device which cools an engine compartment by discharging hot air staying between an engine and a dash panel using a blowing device.

(b) Background

Figure 1:
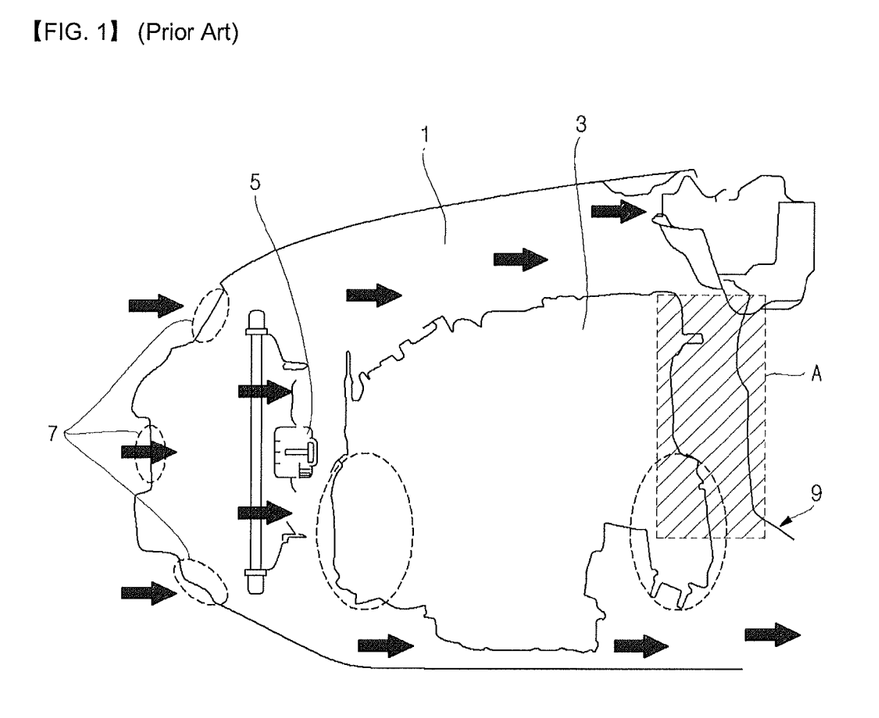
FIG. 1 is a drawing showing a conventional engine compartment.

FIG. 1 shows a conventional engine compartment. A cooling fan 5 is installed at a front of an engine 3 in order to cool the inner part of an engine compartment 1, and external air is introduced into the engine compartment 1 via a bumper grill 7 by the cooling fan 5.

The introduced external air cools the engine compartment 1 and is then discharged through a lower portion of a dash panel 9, but most of air between the engine 3 and the dash panel 9 stays (region A) and this may cause various parts to be damaged by heat.

In particular, this phenomenon becomes much more serious when a vehicle is temporarily parked or just after an engine is turned off after driving. Accordingly, in order to prevent the components in the engine compartment from being heat damaged, it is necessary to discharge the air stayed between the engine and the dash panel to the outside.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to provide a system for cooling an engine compartment using a blowing device having advantages of preventing components in the engine compartment from being heat damaged by discharging the air stayed between an engine and a dash panel.

In one aspect, the present invention provides a system for cooling a vehicle engine compartment comprising: a blowing device provided around a dash panel of the vehicle and configured to be able to send external air to the engine compartment and a cabin of the vehicle; and a control unit to control the blowing device such that the external air may flow into the engine compartment through the heat blower if the temperature of the engine compartment is higher than or equal to a limit temperature above which components in the engine compartment can be heat damaged.

Preferably, the blowing device comprises an external air inlet through which external air inflows, an engine compartment air supplier supplying the external air to an engine compartment, a cabin air supplier supplying the external air to a cabin, a door to supply the external air to at least one of the engine compartment air supplier and the cabin air supplier, and an actuator for actuating the door.

Suitably, the engine compartment air supplier may comprise an opening formed at a side of a main body and a duct connected to the opening and the engine compartment.

The door may comprise: an engine compartment door rotatably installed between the opening and the cabin air supplier, and configured to be able to partially close the cabin air supplier at an operated position and close the opening at a non-operated position; a cabin door rotatably installed on the same line as the engine compartment door, one end of which faces one end part of the engine compartment door and which is configured to be able to close the cabin air supplier at an operated position and open the cabin air supplier at a non-operated position; and a door stopper disposed between the engine compartment door and the cabin door such that the door stopper can contact end parts of the engine compartment door and the cabin door at the operated positions of the engine compartment door and the cabin door so as to close the cabin air supplier.

The actuator may preferably comprise an engine compartment door actuator and a cabin door actuator that are designed to respectively open and/or close the engine compartment door and the cabin door.

The engine compartment door actuator may comprise: a rotating shaft rotating the engine compartment door; a position lever coupled to the rotating shaft and determining a stop position of the rotating shaft such that the engine compartment door is positioned at the operated position and the non-operated position; a spring returning the position lever from an operated position to the non-operated position; and a spring stopper limiting a rotation angle of the position lever such that the position lever does not rotate beyond the operated position.

The cabin door actuator may comprise: a rotating shaft rotating the cabin door; a position lever coupled to the rotating shaft and determining a stop position of the rotating shaft such that the cabin door is positioned at the operated position and the non-operated position; a spring returning the position lever from an operated position to the non-operated position; and a spring stopper limiting a rotation angle of the position lever such that the position lever does not rotate beyond the operated position.

Preferably, the duct may comprise: a first duct connected to the opening and elongated to an upper part of the blowing device; a second duct connected to the first duct and elongated in a side direction; a third duct connected to the second duct and downwardly elongated; a spout grill connected to the third duct, coupled to a lower end of a cowl lower panel, and spouting the external air supplied from the blowing device into the engine compartment; and a duct sealing member installed between the opening and the first duct so as to prevent the air flowed from the outside from leaking to the outside of the blowing device.

In such embodiments, the control unit may operate the blowing device by using electric power of an alternator in a state that an engine of a vehicle is turned on and by using electric power of a battery in a state that the engine is turned off.

Preferably, the control unit may control the blowing device by forcibly converting a cooling/heating mode of a vehicle to an external air supply mode such that the external air can be supplied to the engine compartment if the temperature of the engine compartment is higher than or equal to a limit temperature above which components in the engine compartment can be heat damaged.

In another aspect, the present invention provides a method of cooling a vehicle engine compartment with a blowing device including an engine compartment door and a cabin door, comprising the steps of: operating the engine compartment door and maintaining the cabin door in the non-operated position when the temperature of the engine compartment is higher than or equal to a limit temperature above which heat damage to components of the engine compartment occurs; and returning the engine compartment door to the non-operated position and maintaining the cabin door in the non-operated position.

In a further aspect, motor vehicles are provided that comprise a described system.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

Other aspects of the invention are discussed infra.

BRIEF DESCRIPTION OF THE DRAWINGS

FIG. 5A is a perspective view showing a blowing device of a system for cooling an engine compartment according to an exemplary embodiment of the present invention and air-flow in a state in which an engine compartment is over heated when a heating mode switch is turned on.

Reference numerals set forth in the Drawings includes reference to the following elements as further discussed below:

| 10: engine room | 12: engine |
| 20: cowl lower panel | 30: heater blower |
| 40: cabin | 100: heater blower main body |
| 200: external air inlet | 320: duct |
| 400: cabin air supplier | 510: engine room door |

| 520: cabin door | 530: door stopper |
| 600: actuator | 610: rotating shaft |
| 620: position lever | 630: spring |
| 640: spring stopper | 700: motor |

DETAILED DESCRIPTION

An exemplary embodiment of the present invention will hereinafter be described in detail with reference to the accompanying drawings.

As discussed above, in one aspect, the present invention provides a system for cooling a vehicle engine compartment comprising: a blowing device provided around a dash panel of the vehicle and configured to be able to send external air to the engine compartment and a cabin of the vehicle; and a control unit to control the blowing device such that the external air may flow into the engine compartment through the heat blower if the temperature of the engine compartment is higher than or equal to a limit temperature above which components in the engine compartment can be heat damaged.

Figure 2:
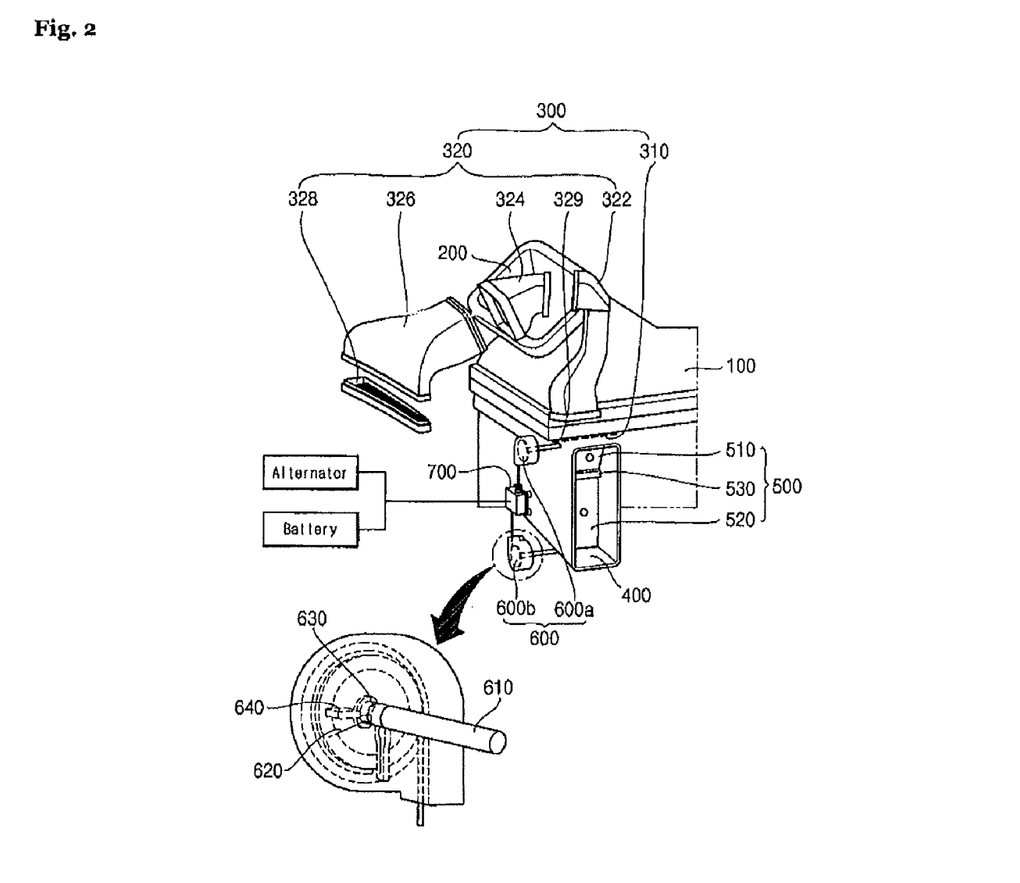
FIG. 2 is a perspective view of a blowing device of a system for cooling an engine compartment according to an exemplary embodiment of the present invention.
Figure 3:
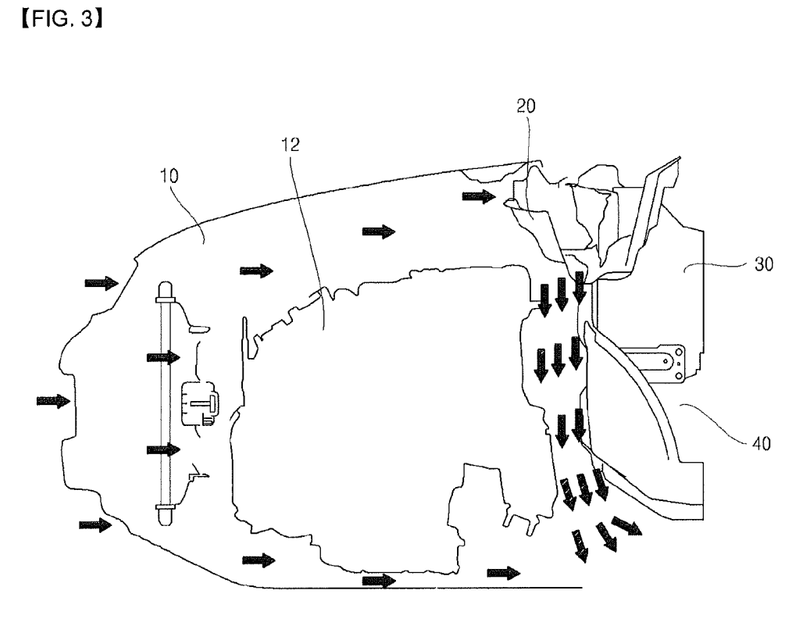
FIG. 3 is a perspective view showing a state in which a blowing device of a system for cooling an engine compartment according to an exemplary embodiment of the present invention is mounted.

FIG. 2 is a perspective view of a blowing device of a system for cooling an engine compartment according to an exemplary embodiment of the present invention, and FIG. 3 is a perspective view showing a state in which a blowing device of a system for cooling an engine compartment according to an exemplary embodiment of the present invention is mounted.

As shown in FIG. 2 and FIG. 3, a system for cooling an engine compartment using a blowing device according to an exemplary embodiment of the present invention is realized by: a blowing device 30 sending external air to an engine compartment 10 and a cabin 40 of a vehicle, and respective sensors (not shown) detecting temperature of the engine compartment 10, a cooling/heating mode, and an on/off state of an engine; and a control unit controlling the blowing device 30 and the sensors.

The blowing device 30 includes: an external air inlet 200 through which external air inflows; an engine compartment air supplier 300 and a cabin air supplier 400 which respectively supply the external air to the engine compartment 10 and the cabin 40; a door 500, which defines therein guide passages, to supply the external air to the engine compartment 10 or the cabin 40, or both; and an actuator 600 and a motor 700 for actuating the door 500.

The engine compartment air supplier 300 comprises an opening 310 formed at a side of a blowing device main body 30 and a duct 320 connecting the engine compartment 10 and the opening 310.

The external air that has flowed from the outside through the external air inlet 200 comes into the engine compartment 10 via the opening 310 and the duct 320, and pushes the hot air stayed between the engine compartment 10 and a dash panel 9 (the same reference numeral with that of a prior art is used).

The duct 320 serves as a passage for supplying external air flowed through the external air inlet 200 to the engine compartment 10, and is connected to the outside of the opening 310 and is elongated to the engine compartment 10.

The duct 320 comprises: a first duct 322 which is connected to the opening 310 and is elongated to an upper part of the blowing device main body 30; a second duct 324 which is connected to the first duct 322 and is elongated in a side direction; a third duct 326 which is connected to the second duct 324 and is downwardly elongated; and a spout grill 328 which is connected to the third duct 326 and is coupled to a lower end of a cowl lower panel 20 communicating with the engine compartment 10 so as to spout the external air supplied from the blowing device 30 into the engine compartment 10.

The duct 320 further includes a duct sealing member 329 which is installed between the opening 310 and the first duct so as to prevent the air flowed from the outside from leaking to the outside of the blowing device 30.

As shown in FIG. 2 and FIG. 3, the cabin air supplier 400 is formed at a side of the main body 100 in the vicinity of the opening 310, and discharges external air into the cabin 40 of a vehicle when a cooling/heating mode is an external air mode. The door 500 is formed between the opening 310 and the cabin air supplier 400.

The door 500 includes an engine compartment door 510 for opening/closing the opening 310 and partially closing or opening the cabin air supplier 400, a cabin door 520 for opening/closing the cabin air supplier 400, and a door stopper 530 disposed between the engine compartment door 510 and the cabin door 520 so as to close ends thereof.

The engine compartment door 510 is rotatably installed between the opening 310 and the cabin air supplier 400 to be adjacent to an upper surface of the cabin air supplier 400. An end part of the engine compartment door 510 contacts the door stopper 530 at an operated position thereof so that the engine compartment door 510 closes a portion of an upper part of the cabin air supplier 400, and the engine compartment door 510 closes the opening 310 at a non-operated position. Accordingly, the opening 310 communicating with the engine compartment 10 is opened at the operated position of the engine compartment door 510 so that the external air flowing through the external air inlet 200 can be discharged into the engine compartment 10.

The cabin door 520 is rotatably installed on the same line as the engine compartment door 510, is rotatably connected to be adjacent to a lower surface of the cabin air supplier 400, and is disposed such that an end part thereof faces an end part of the engine compartment door 510. An end part of the cabin door 520 contacts the door stopper 530 at an operated position thereof so that the cabin door 520 closes the cabin air supplier 400, and the cabin door 520 opens the cabin air supplier 400 at a non-operated position thereof. Accordingly, the external air flowing through the external air inlet 200 can be supplied to the cabin 40 at the non-operated position of the cabin door 520.

The door stopper 530 is disposed at a position where the door stopper 530 can contact end parts of the engine compartment door 510 and the cabin door 520 at operated positions thereof. When the engine compartment door 510 and the cabin door 520 are disposed at operated positions, the cabin air supplier 400 can be closed by the door stopper such that external air flowing through the external air inlet is prevented form being discharged into the cabin air supplier 400. As shown in FIG. 2, the motor 700 drives the actuator 600 so as to operate the engine compartment door 510 and the cabin door 520. The actuator 600 includes an engine compartment door actuator 600a which actuates the engine compartment door 510, and a cabin door actuator 600b which actuates the cabin door 520 (structures of them are equal to one another, so only the engine compartment door actuator will be explained).

The engine compartment door actuator 600a includes: a rotating shaft 610 which rotates the engine compartment door 510 while being rotated by the motor 700: a position lever 620 which is coupled to the rotating shaft 610 and determines a stop position of the rotating shaft 610 such that the engine compartment door 510 is positioned at the operated position and the non-operated position respectively; a spring 630 which returns the position lever 620 from the operated position to the non-operated position; and a spring stopper 640 limiting a rotation angle of the position lever 620 such that the position lever 620 is not rotated beyond the operated position.

In the case that the engine compartment door 510 needs to be operated, the motor 700 continuously operates such that the position lever 620 is maintained at the operated position while the engine compartment door 510 is maintained at the operated position.

However, since operating time of the engine compartment door 510 to discharge the hot air stayed at the engine compartment 10 is short (i.e., about 10 to 30 seconds), it is preferable that only the movement of the position lever 620 to the operated position is controlled and the movement of the position lever 620 to the non-operated position is automatically controlled by the restoring force of the spring 630.

The blowing device 30 is controlled by the control unit (not shown). In the case that the temperature of the engine compartment 10 is higher than or equal to a limit temperature, external air is flowed through the blowing device 30 so as to discharge the stayed hot air from the engine compartment 10. Generally, the temperature of the engine compartment 10 arises to the limit temperature while a vehicle temporally stops or just after an engine is turned off.

A limit temperature is a temperature slightly lower than a temperature at which various parts inside the engine compartment 10 are heat damaged, and may be set through experiments in accordance with a type of a vehicle.

The control unit operates the blowing device by using electric power of an alternator in a state that an engine of a vehicle is turned on and by using electric power of a battery in a state that an engine of a vehicle is turned off. This can be realized by a sensor detecting whether an engine is turned on.

The control unit determines whether temperature in the engine compartment 10 becomes higher than or equal to the limit temperature on the basis of a temperature signal of the sensor detecting temperature of the engine compartment 10, and if so, the control unit controls the blowing device 30 so as to send external air to the engine compartment 10, thereby discharging the stayed hot air to the outside.

Furthermore, the control unit controls the blowing device 30 according to whether cooling/heating mode of a vehicle is an external air supply mode or a heating mode, whether an engine is turned on or off, etc. For this operation, sensors detecting the cooling/heating mode and whether an engine is turned on or off are provided.

A state of the blowing device and air-flow according to a state of an engine compartment in a system for cooling an engine compartment using a blowing device will be explained hereinafter.

Figure 4A:
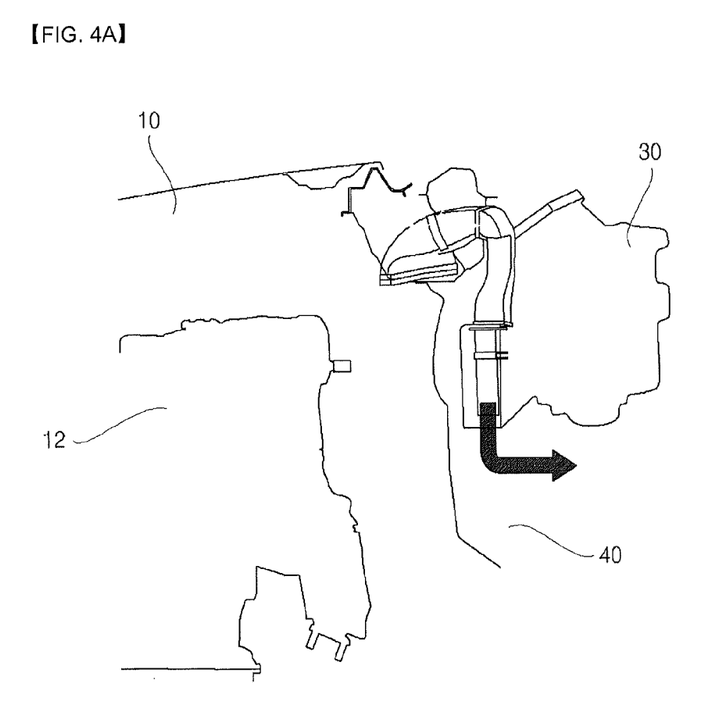
FIG. 4A is a perspective view showing a blowing device of a system for cooling an engine compartment according to an exemplary embodiment of the present invention and air-flow in a normal state of an engine compartment.
Figure 4B:
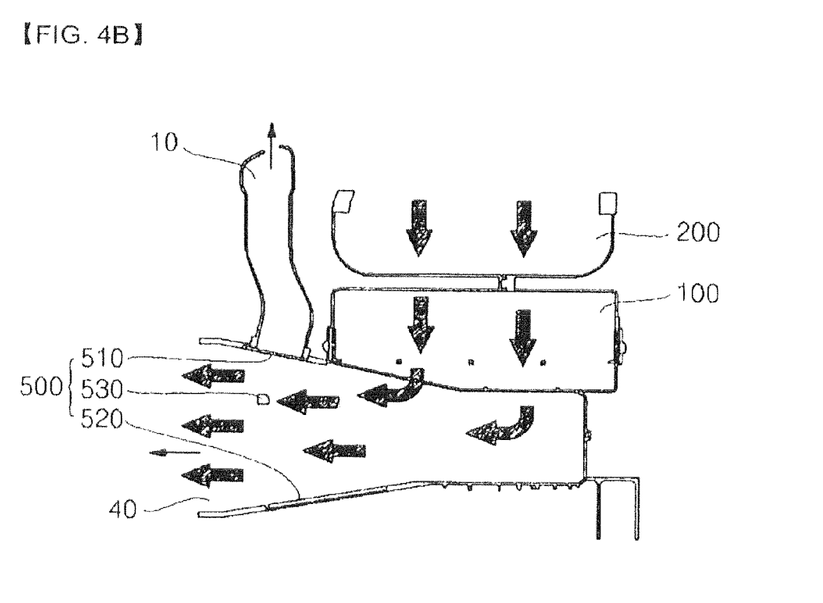
FIG. 4B is a schematic diagram showing air-flow within a blowing device of FIG. 4A.

FIG. 4A is a perspective view showing a blowing device of a system for cooling an engine compartment according to an exemplary embodiment of the present invention and air-flow in a normal state of an engine compartment, and FIG. 4B is a schematic diagram showing air-flow within a blowing device of FIG. 4A. As shown in FIG. 4A and FIG. 4B, in the case that the temperature of the engine compartment 10 is lower than the limit temperature in a state that the cooling/heating mode of a vehicle is an external air supply mode, it is not necessary to supply external air into the engine compartment 10. Accordingly, the control unit controls the engine compartment door 510 and the cabin door 520 to be maintained at the non-operated positions, and in this state, the opening 310 communicating with the engine compartment 10 is closed by the engine compartment door 510.

The cabin air supplier 400 communicating with the cabin 40 is maintained to an opened state since the engine compartment door 510 and the cabin door 520 are in non-operated states. Accordingly, external air flowed into the blowing device 30 through the external air inlet 200 can be flowed into the cabin 40 through the cabin air supplier 400.

Figure 5A:
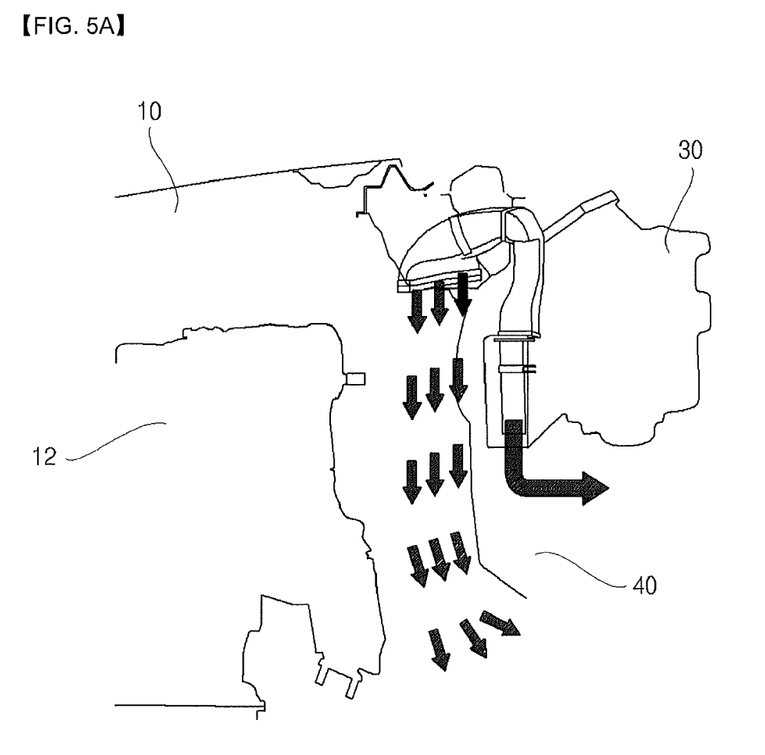
Figure 5B:
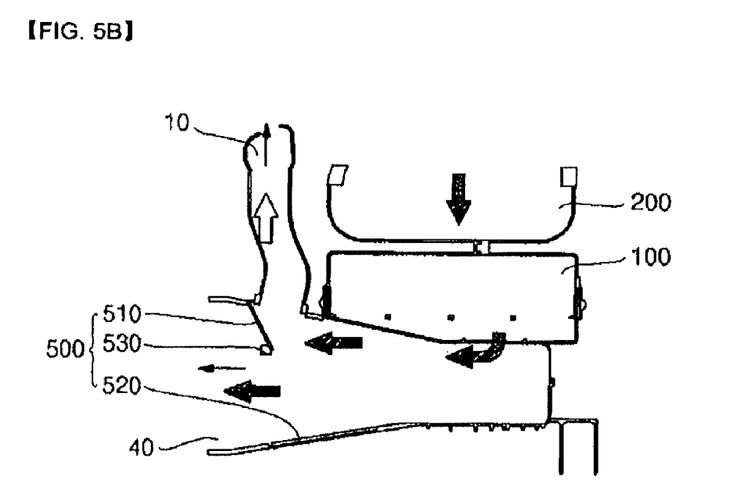
FIG. 5B is a schematic diagram showing air-flow within a blowing device of FIG. 5A.

FIG. 5A is a perspective view showing a blowing device of a system for cooling an engine compartment according to an exemplary embodiment of the present invention and air-flow in a state in which an engine compartment is over heated when a heating mode switch is turned on, and FIG. 5B is a schematic diagram showing air-flow within a blowing device of FIG. 5A.

As shown in FIG. 5A and FIG. 5B, in the case that the temperature of the engine compartment 10 is higher than or equal to the limit temperature in a state that the cooling/heating mode of a vehicle is a heating mode, air should be supplied to both the engine compartment 10 and the cabin 40. Accordingly, the control unit converts the cooling/heating mode of a vehicle into an external air mode.

Then, only the engine compartment door actuator 600a is operated so as to actuate the engine compartment door 510 such that the opening 310 communicating with the engine compartment 10 is opened, and the cabin door 520 is maintained at the non-operated state. Since the opening 310 is opened by the operation of the engine compartment door 510, external air flows into the engine compartment 10 through the duct 320, thereby pushing out the hot air stayed between an engine 12 and a dash panel 9. The stayed hot air passes out through a space between a lower end portion of the dash panel 9 and lower structures of a vehicle.

In addition, since the cabin air supplier 400 is opened while the cabin door 520 is maintained at the non-operated state, external air may also be supplied to the cabin 40 (the air is heated by a heater and is then supplied to the cabin).

At this time, although the cabin air supplier 400 is partially closed by the engine compartment door 510, air may be supplied to the cabin 40 without being hindered since the engine compartment door 510 operates for short time of about 10 to 30 seconds in order to discharge the hot air stayed between the engine 12 and a dash panel (the same member as a member which is indicated by reference numeral 9 in the drawing of the prior art).

Figure 6A:
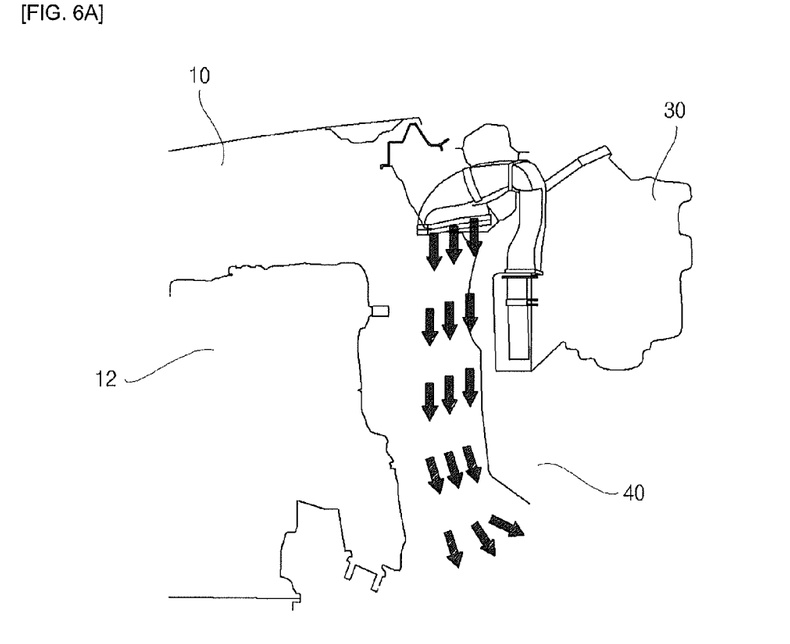
FIG. 6A is a perspective view showing a blowing device of a system for cooling an engine compartment according to an exemplary embodiment of the present invention and air-flow in a state in which an engine compartment is over heated when a heating mode switch is turned off.
Figure 6B:
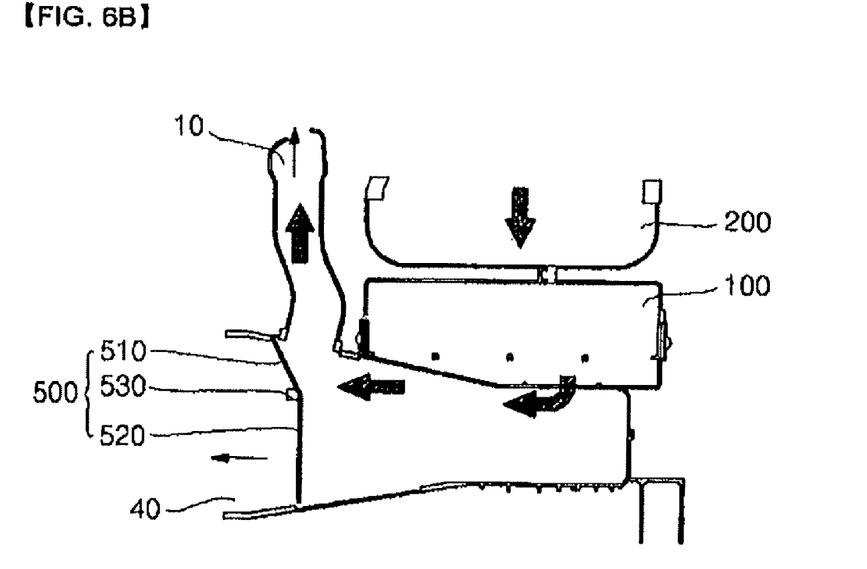
FIG. 6B is a schematic diagram showing air-flow within a blowing device of FIG. 6A.

FIG. 6A is a perspective view showing a blowing device of a system for cooling an engine compartment according to an exemplary embodiment of the present invention and air-flow in a state in which an engine compartment is over heated when a heating mode switch is turned off, and FIG. 6B is a schematic diagram showing air-flow within a blowing device of FIG. 6A.

As shown in FIG. 6A and FIG. 6B, in the case that the temperature of the engine compartment 10 is higher than or equal to the limit temperature in a state that a heating mode switch is turned off, air supply to the cabin 40 should be cut off, and all air flowed from the outside should be supplied to the engine compartment 10. Accordingly, the control unit converts the cooling/heating mode of a vehicle into the external air supply mode.

Then, the control unit controls the engine compartment door 510 and the cabin door 520 to move to the operated positions so that the opening 310 communicating with the engine compartment 10 is opened and the cabin air supplier 400 communicating with the cabin 40 is closed.

Since the opening 310 is opened by the operation of the engine compartment door 510 and all air is supplied to the engine compartment 10, air flowed from the outside flows into the engine compartment 10 through the duct 320 so as to push the hot air stayed between the engine 12 and the dash panel 9. The stayed hot air passes out through a lower end portion of the dash panel 9 and lower structures of a vehicle.

If all the air stayed at the engine compartment 10 is discharged, the engine compartment door 510 and the cabin door 520 are returned to their original positions, and the external air supply mode is cancelled, returning to a state before the operation.

Since the engine compartment is cooled by sending external air into the engine compartment using the blowing device, various components in the engine compartment can be protected from damages by heat, and durability of the components can be enhanced.

In another aspect, as discussed above, the present invention provides a method of cooling a vehicle engine compartment with a blowing device including an engine compartment door and a cabin door, comprising the steps of: operating the engine compartment door and maintaining the cabin door in the non-operated position when the temperature of the engine compartment is higher than or equal to a limit temperature above which heat damage to components of the engine compartment occurs; and returning the engine compartment door to the non-operated position and maintaining the cabin door in the non-operated position.

Figure 7:
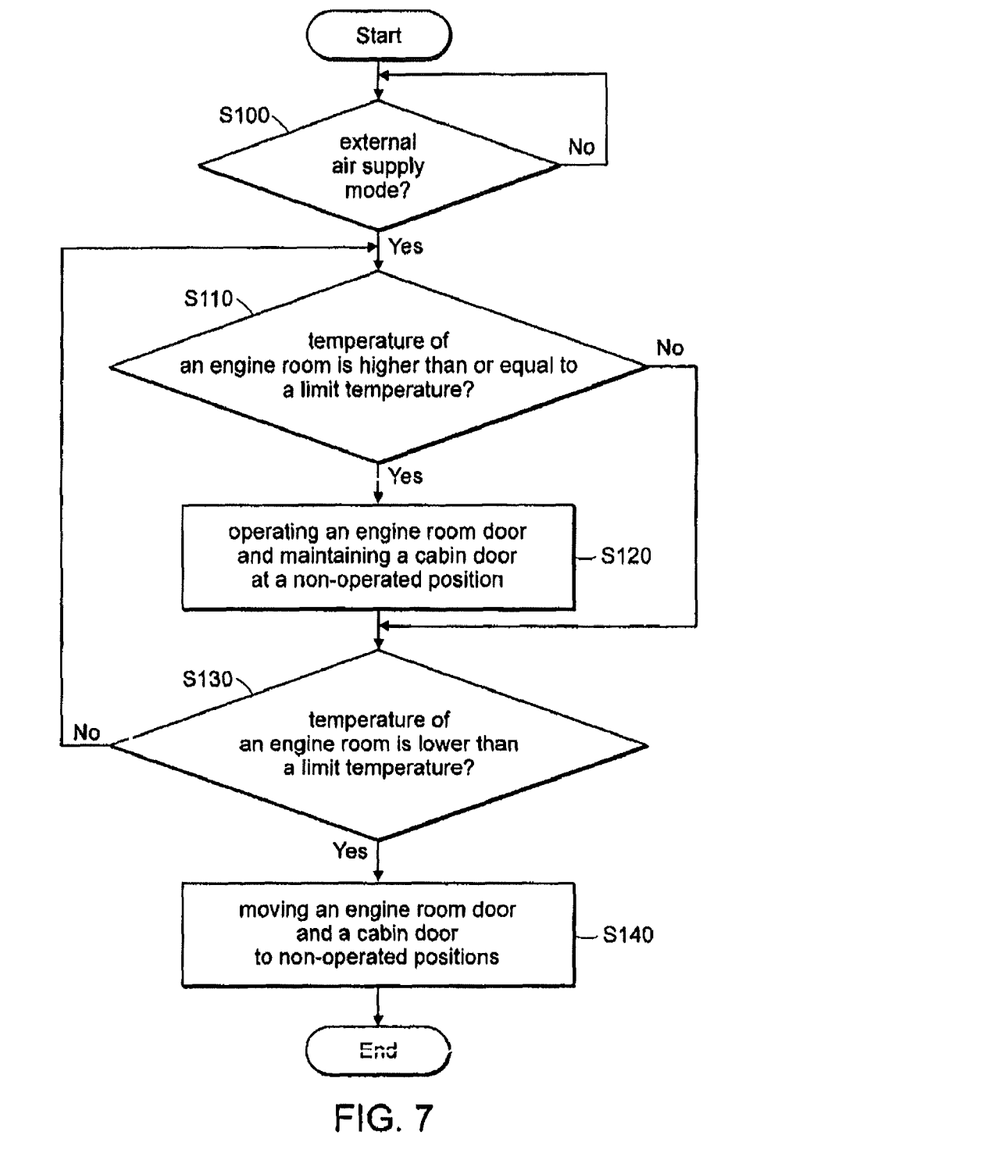
FIG. 7 and FIG. 8 are flowcharts of a method for cooling an engine compartment using a blowing device according to an exemplary embodiment of the present invention.

FIG. 7 is a flowchart a method for cooling an engine compartment using a blowing device according to an exemplary embodiment of the present invention.

As shown in FIG. 7, the control unit determines whether the cooling/heating mode of a vehicle is an external air supply mode based on a signal of a sensor at step S100. If so, the control unit determines whether the temperature of the engine compartment 10 is higher than or equal to the limit temperature above which components in the engine compartment are heat damaged, on the basis of a signal of a sensor, at step S110. If the temperature of the engine compartment 10 is higher than or equal to the limit temperature, step S130 is performed.

If the temperature of the engine compartment 10 is higher than or equal to the limit temperature, since external air should be supplied to both the engine compartment 10 and the cabin 40, the engine compartment door 510 is operated and the cabin door 520 is maintained at the non-operated position at step S120. Although the cabin air supplier 400 is partially closed by the engine compartment door 510, the door of the engine compartment 10 is operated for several tens seconds, so external air can be supplied to the cabin 40 without being hindered.

Subsequently, at step S130, it is determined whether the temperature of the engine compartment 10 is lower than the limit temperature. If the temperature of the engine compartment 10 is lower than the limit temperature, it does not need to send air to the engine compartment 10, the engine compartment door 510 is turned to the non-operated position, and the cabin door 520 is maintained to the non-operated position, at step S140. On the other hand, if the temperature of the engine compartment 10 is not lower than the limit temperature, step S110 is again performed.

Figures 8, 8A:
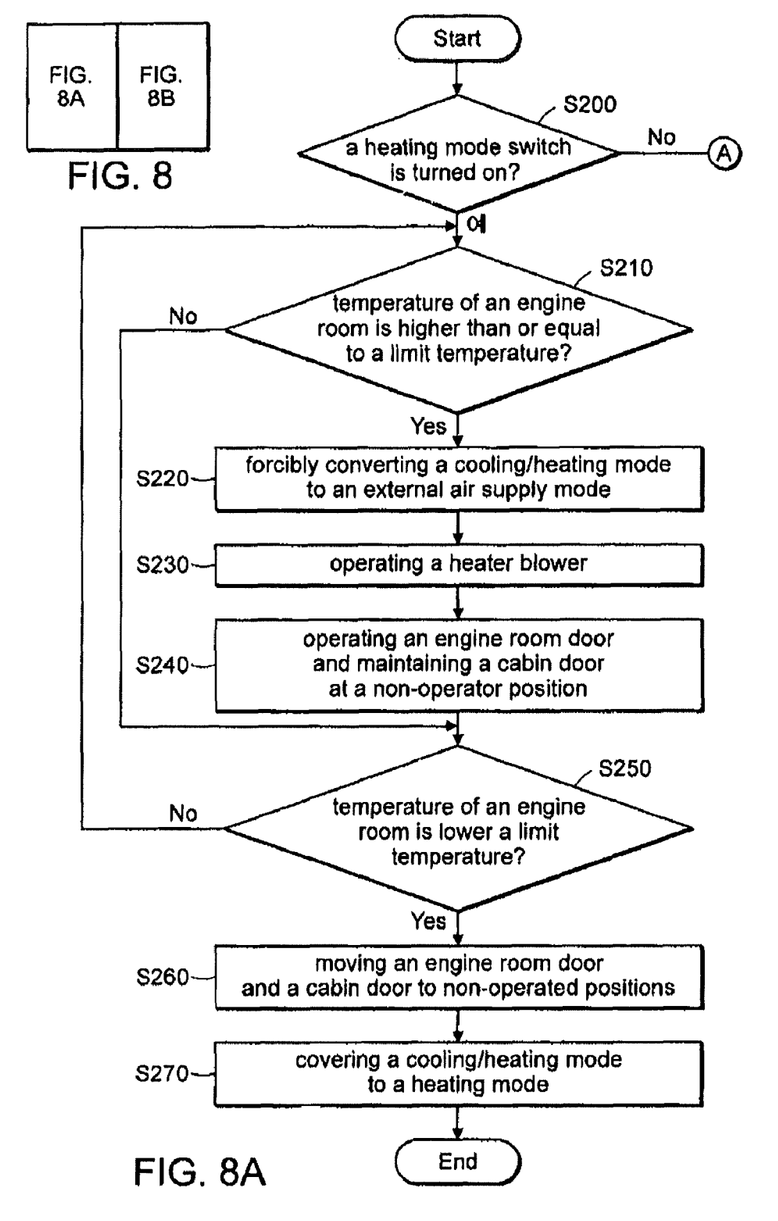
Figure 8B:
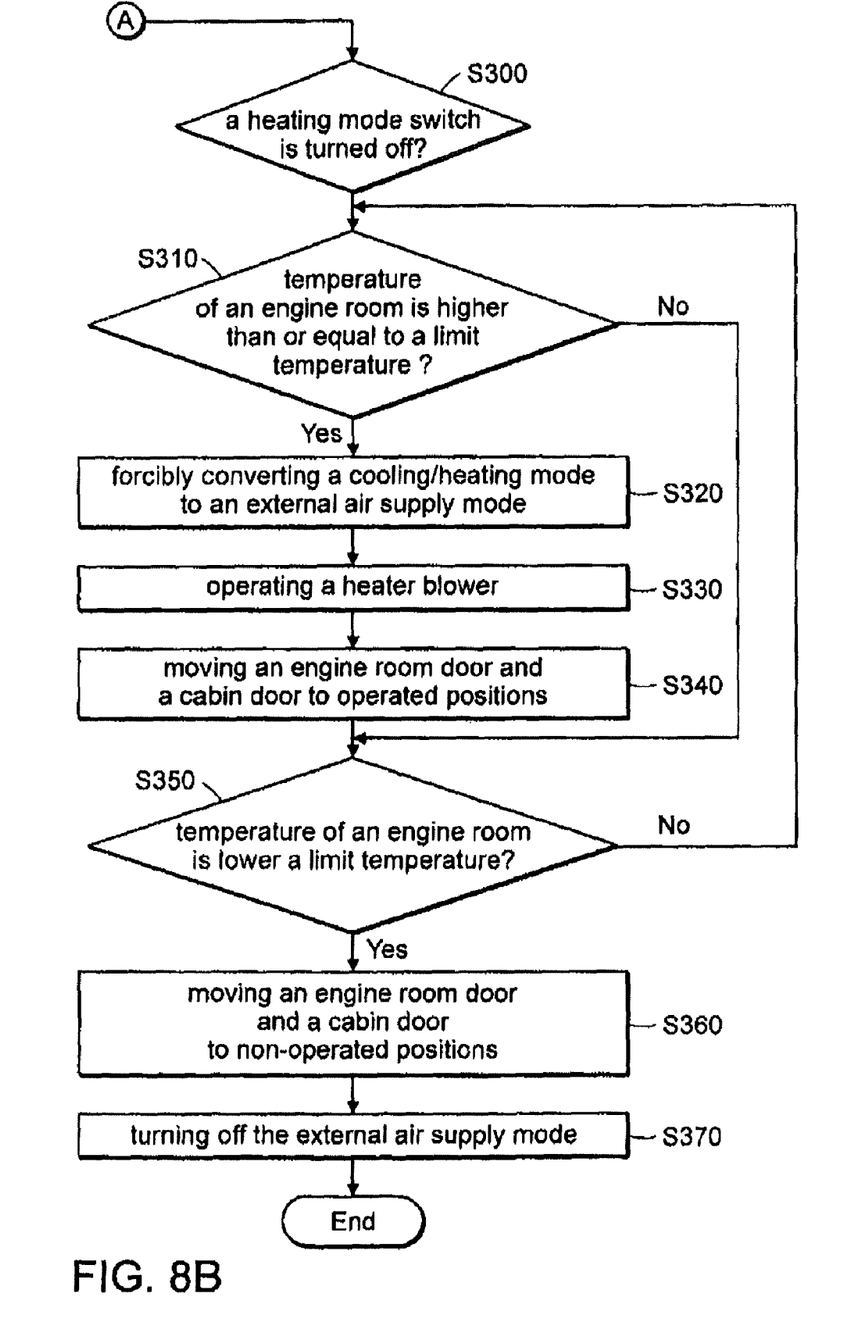

Meanwhile, in the case that the cooling/heating mode of a vehicle is set as a heating mode or is not set, the blowing device is controlled by the steps shown in FIG. 8.

As shown in FIG. 8, the control unit determines at step S200 whether the heating mode switch is turned on based on a signal of a sensor. If so, the control unit determines at step S210 whether the temperature of the engine compartment 10 is higher than or equal to the limit temperature above which components are heat damaged on the basis of temperature information from a sensor. If the temperature of the engine compartment 10 is not higher than or equal to the limit temperature, step S250 is performed.

If the temperature of the engine compartment 10 is higher than or equal to the limit temperature, the cooling/heating mode is forcibly converted to the external air supply mode at step S220, and then the blowing device is operated at step S230. External air is introduced into the blowing device 30 by the external air supplier of the blowing device 30.

As air should be supplied to both the engine compartment 10 and the cabin 40, the engine compartment door 510 is operated and the cabin door 520 is maintained to the non-operated position at step S240 such that external air is supplied to both the engine compartment 10 and the cabin 40. At this time, although the cooling/heating mode of a vehicle is temporarily converted to the external air supply mode, it takes a couple of tens of seconds to discharge the hot air stayed in the engine compartment 10, so it does not affect the heating operation.

Subsequently, at step S250, it is determined whether the temperature of the engine compartment 10 is lower than the limit temperature at which components are damaged by heat. If the temperature of the engine compartment 10 is lower than the limit temperature, the engine compartment door 510 is returned to the non-operated position, and the cabin door 520 is maintained at the non-operated position, at step S260. On the other hand, if the temperature of the engine compartment 10 is not lower than the limit temperature, the step S210 is again performed.

Finally, the cooling/heating mode is converted to the heating mode at step S270, thereby completing the cooling of the engine compartment 10.

If the heating mode switch is not in a turned-on state, it is determined whether the heating mode switch is in a turned-off state at step S300.

If the heating mode switch is in the turned-off state, it is determined whether the temperature of the engine compartment 10 is higher than or equal to the limit temperature above which components in the engine compartment 10 are damaged by heat at step S310. If the temperature of the engine compartment 10 is higher than or equal to the limit temperature, the cooling/heating mode is forcibly converted to the external air supply mode at step S320. On the other hand, if the temperature of the engine compartment 10 is not higher than or equal to the limit temperature, step S350 is performed.

Subsequently, at step S330, the blowing device 30 is operated so as to intake external air. Since the heating mode switch is turned off, it does not need to send air to the cabin 40. Accordingly, at step S340, both the engine compartment door 510 and the cabin door 520 are moved to the operated positions so as to close the cabin air supplier 400 such that external air is supplied only to the engine compartment 10.

Subsequently, at step S350, it is determined whether the temperature of the engine compartment 10 is lower than the limit temperature at which components in the engine compartment 10 are heat damaged, and if the temperature of the engine compartment 10 is lower than the limit temperature, the engine compartment door 510 and the cabin door 520 are returned to the non-operated positions at step S360. On the other hand, if the temperature of the engine compartment 10 is not lower than the limit temperature, the step S310 is again performed.

Finally, the external air supply mode is turned off at step S370, thereby completing the cooling of the engine compartment 10.

As described above, the systems for cooling an engine compartment using a blowing device and the methods for cooling the same can effectively cool the engine compartment by sending external air into an engine compartment using a blowing device, preventing various components in an engine compartment from being heat damaged and enhancing durability of the components.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for cooling a vehicle engine compartment comprising:
   a blowing device provided on a dash panel of the vehicle and configured to be able to send external air to the engine compartment and a cabin of the vehicle;
   a control unit to control the blowing device such that the external air may flow into the engine compartment through the blowing device if the temperature of the engine compartment is higher than or equal to a limit temperature above which components in the engine compartment can be heat damaged;
   a door having an engine compartment door rotatably installed between an opening in the blowing device and a cabin air supplier and configured to be able to partially close the cabin air supplier at an operated position and close the opening at a non-operated position, and a cabin door rotatably installed on the same line as the engine compartment door, one end of which faces one end part of the engine compartment door and which is configured to be able to close the cabin air supplier at an operated position and open the cabin air supplier at a non-operated position; and
   an actuator for opening and/or closing the engine compartment door and the cabin door, respectively.

2. The system of claim 1, wherein the blower device comprises: an external air inlet through which external air inflows; an engine compartment air supplier supplying the external air to the engine compartment; a cabin air supplier supplying the external air to the cabin; a door to supply the external air to at least one of the engine compartment air supplier and the cabin air supplier; and a motor for operating the actuator.

3. The system of claim 2, wherein the engine compartment air supplier comprises an opening formed at a side of a main body and a duct connected to the opening and the engine compartment.

4. The system of claim 3, wherein the duct comprises:
   a first duct connected to the opening and elongated to an upper part of the blowing device;
   a second duct connected to the first duct and elongated in a side direction;
   a third duct connected to the second duct and downwardly elongated;
   a spout grill connected to the third duct, coupled to a lower end of a cowl lower panel, and spouting the external air supplied from the blowing device into the engine compartment; and
   a duct sealing member installed between the opening and the first duct so as to prevent the air flowed from the outside from leaking to the outside of the blowing device.

5. The system of claim 1, wherein the door further comprises:
   a door stopper disposed between the engine compartment door and the cabin door such that the door stopper can contact end parts of the engine compartment door and the cabin door at the operated positions of the engine compartment door and the cabin door so as to close the cabin air supplier.

6. The system of claim 1, wherein the actuator comprises an engine compartment door actuator and a cabin door actuator respectively opening and/or closing the engine compartment door and the cabin door.

7. The system of claim 6, wherein the engine compartment door actuator comprises:
- a rotating shaft rotating the engine compartment door;
- a position lever coupled to the rotating shaft and determining a stop position of the rotating shaft such that the engine compartment door is positioned at the operated position and the non-operated position;
- a spring returning the position lever from an operated position to the non-operated position; and
- a spring stopper limiting a rotation angle of the position lever such that the position lever does not rotate beyond the operated position.

8. The system of claim 6, wherein the cabin door actuator comprises:
- a rotating shaft rotating the cabin door;
- a position lever coupled to the rotating shaft and determining a stop position of the rotating shaft such that the cabin door is positioned at the operated position and the non-operated position;
- a spring returning the position lever from an operated position to the non-operated position; and
- a spring stopper limiting a rotation angle of the position lever such that the position lever does not rotate beyond the operated position.

9. The system of any one of claims 1 to 4, wherein the control unit operates the blowing device by using electric power of an alternator in a state that an engine of a vehicle is turned on and by using electric power of a battery in a state that the engine is turned off.

10. The system of claim 9, wherein the control unit controls the blowing device by forcibly converting a cooling/heating mode of a vehicle to an external air supply mode such that the external air can be supplied to the engine compartment if the temperature of the engine compartment is higher than or equal to a limit temperature above which components in the engine compartment can be heat damaged.

11. A motor vehicle comprising a system including;
- a blowing device provided on a dash panel of the vehicle and configured to be able to send external air to the engine compartment and a cabin of the vehicle;
- a control unit to control the blowing device such that the external air may flow into the engine compartment through the heat blower if the temperature of the engine compartment is higher than or equal to a limit temperature above which components in the engine compartment can be heat damaged;
- a door comprising an engine compartment door rotatable installed between an opening in the blowing device and a cabin air supplier and configured to be able to partially close the cabin air supplier at an operated position and close the opening at a non-operated position, and a cabin door rotatably installed on the same line as the engine compartment door, one end of which faces one end part of the engine compartment door and which is configured to be able to close the cabin air supplier at an operated position and open the cabin air supplier at a non-operated position; and
- an actuator for opening and/or closing the engine compartment door and the cabin door, respectively.

* * * * *